INVENTOR
JOHN B. WEST
BY Albert J. Kramer
ATTORNEY

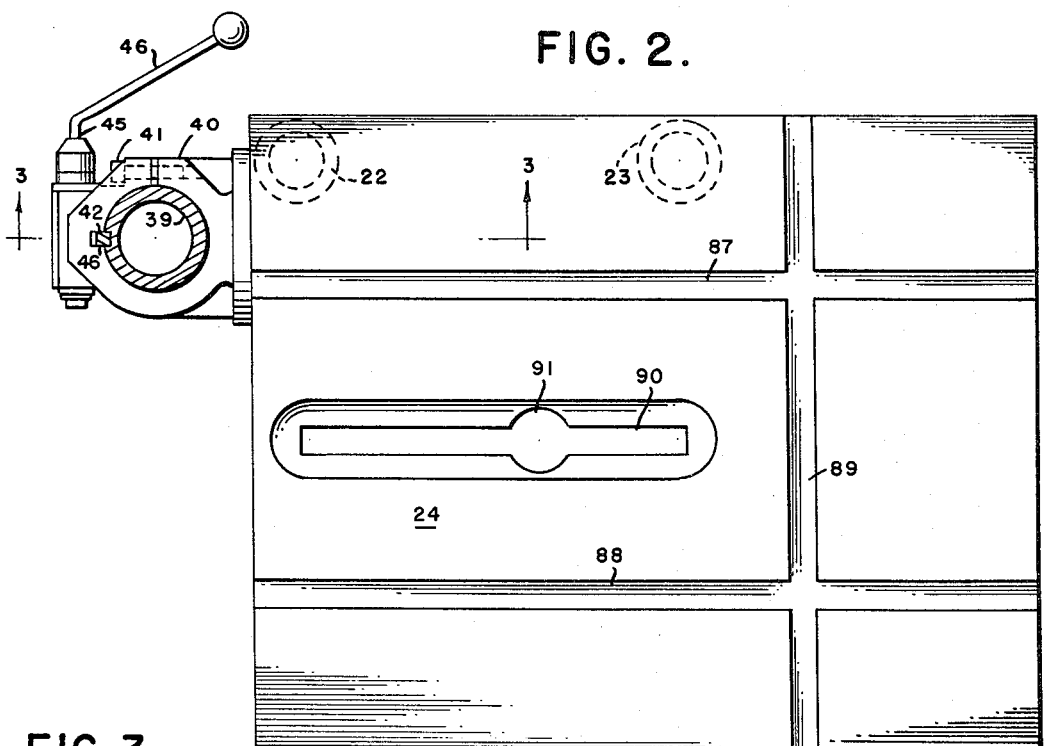
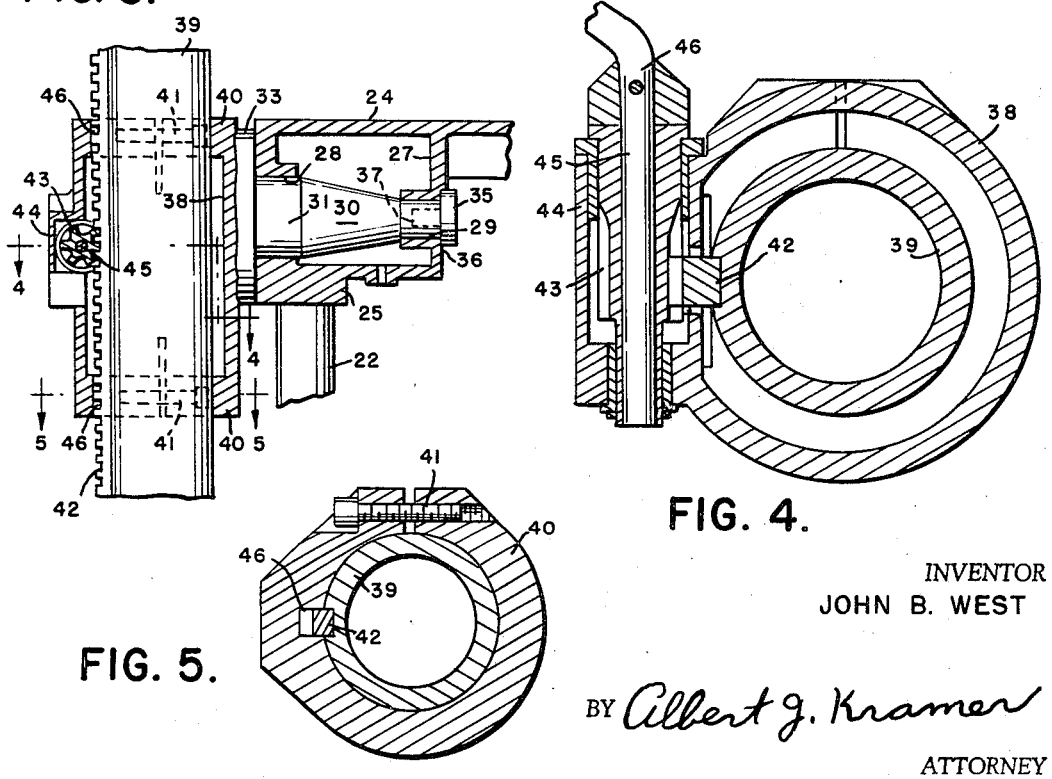

June 11, 1968     J. B. WEST     3,387,638

MULTIPURPOSE SHOP TOOL

Filed May 20, 1966     7 Sheets-Sheet 3

INVENTOR
JOHN B. WEST

BY *Albert J. Kramer*
ATTORNEY

INVENTOR
JOHN B. WEST

BY *Albert J. Kramer*

ATTORNEY

INVENTOR
JOHN B. WEST

BY *Albert J. Kramer*
ATTORNEY

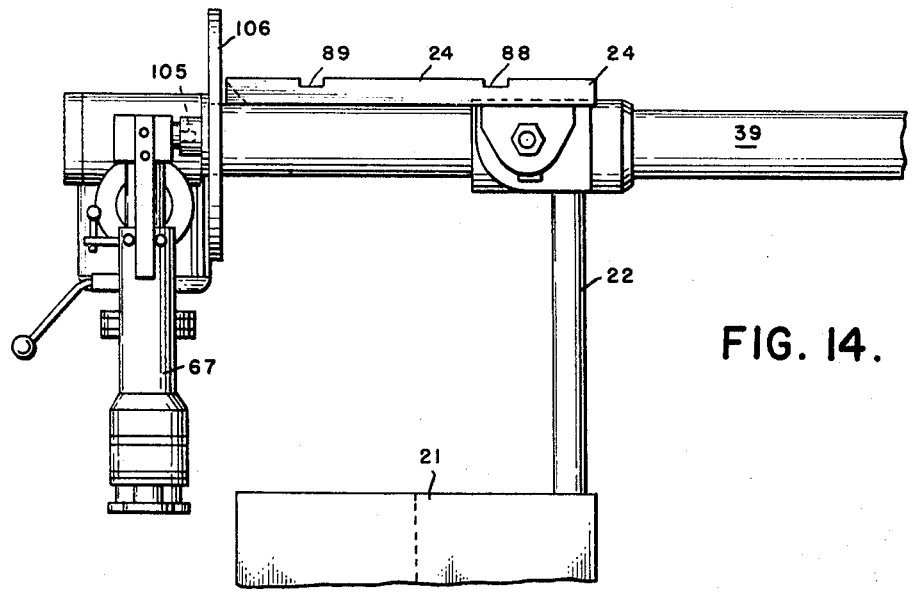
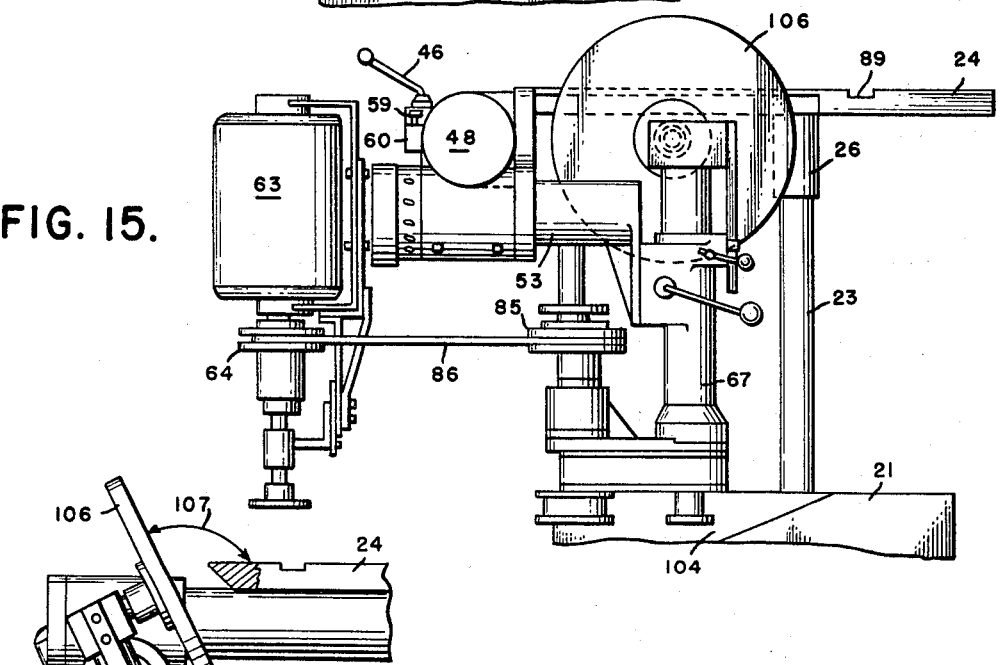
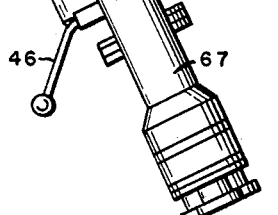

June 11, 1968 J. B. WEST 3,387,638
MULTIPURPOSE SHOP TOOL
Filed May 20, 1966 7 Sheets-Sheet 7

INVENTOR
JOHN B. WEST

BY *Albert J. Kramer*
ATTORNEY

United States Patent Office 3,387,638
Patented June 11, 1968

3,387,638
MULTIPURPOSE SHOP TOOL
John B. West, Grasty Road, Pikesville, Md. 21208
Filed May 20, 1966, Ser. No. 551,715
10 Claims. (Cl. 144—1)

This invention relates to a shop tool and it is more particularly concerned with a power driven device which can be adapted for a number of different shop operations, such as sawing, drilling, boring, shaping, lathework and sanding.

The general object of the invention is the provision of such a device which is adaptable to a wide variety of shop operations and which is readily changed from a position for one operation to that of any other operation by relatively simple manipulations.

Another object is the provision of such a device which is relatively compact so as to be useful in places where only limited space is available, such as in homes and apartment dwellings.

Still another object is the provision of novel means for achieving different tool positions for the different operations.

Still further objects, advantages and features of the invention will appear more fully from the following description, considered together with the accompanying drawing.

In the drawing:

FIG. 2 is a plan sectional view along the line 2—2 of FIG. 1.

FIG. 3 is a sectional view along the line 3—3 of FIG. 2.

FIGS. 4 and 5 are sectional views along the lines 4—4 and 5—5, respectively, of FIG. 3.

Figure 1:
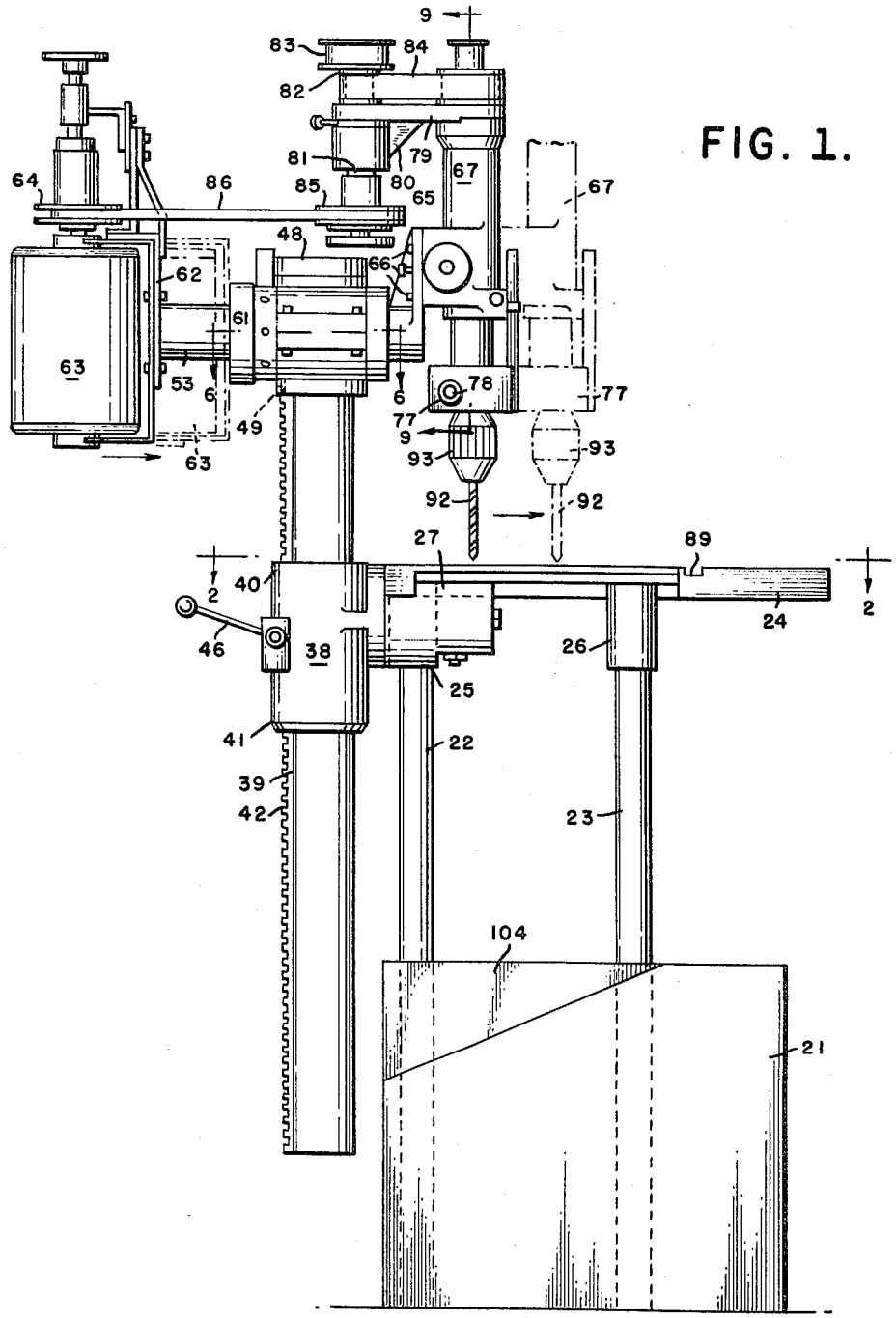
FIG. 1 is a front elevational view of an embodiment of the invention in position for drilling operations, showing in broken lines an outline of the position of parts shifted to a different drilling position.
Figure 6:
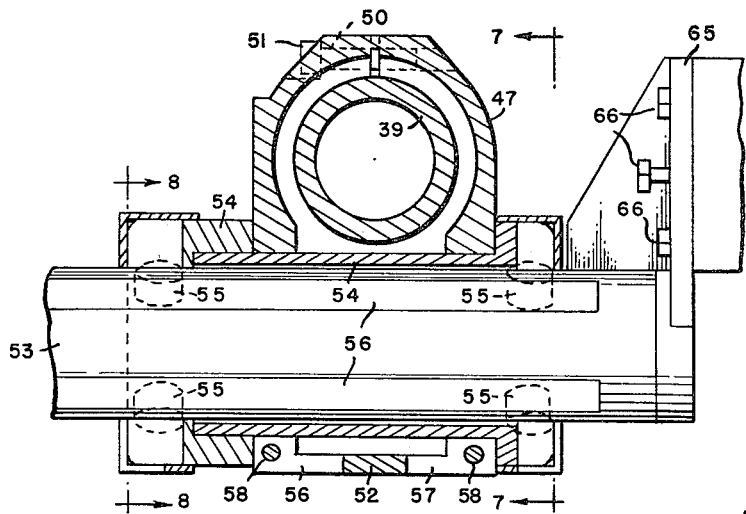

FIG. 6 is a sectional view along the line 6—6 of FIG. 1, on a larger scale.

Figure 7:
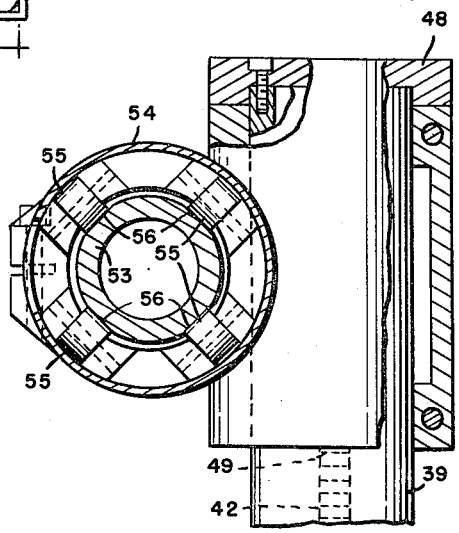
Figure 8:
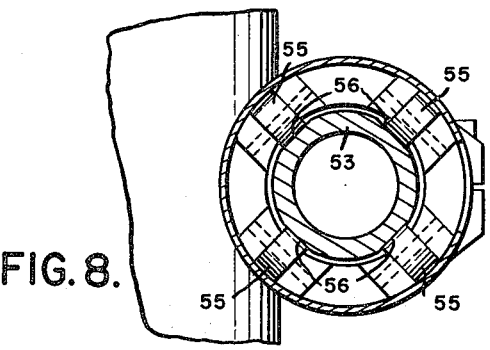

FIGS. 7 and 8 are sectional views along the lines 7—7 and 8—8, respectively, of FIG. 6.

Figure 9:
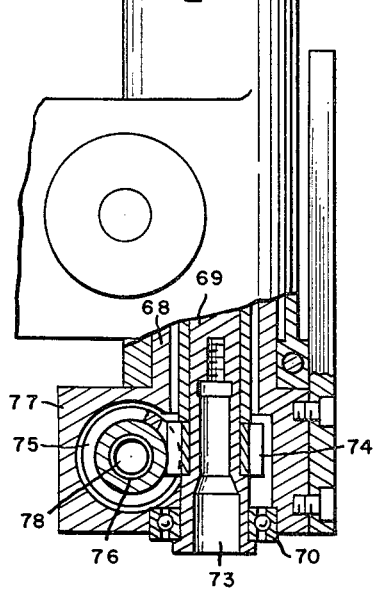

FIG. 9 is a sectional view of a vertical plane at right angles to the plane of FIG. 1 at the line 9—9.

Figure 10:
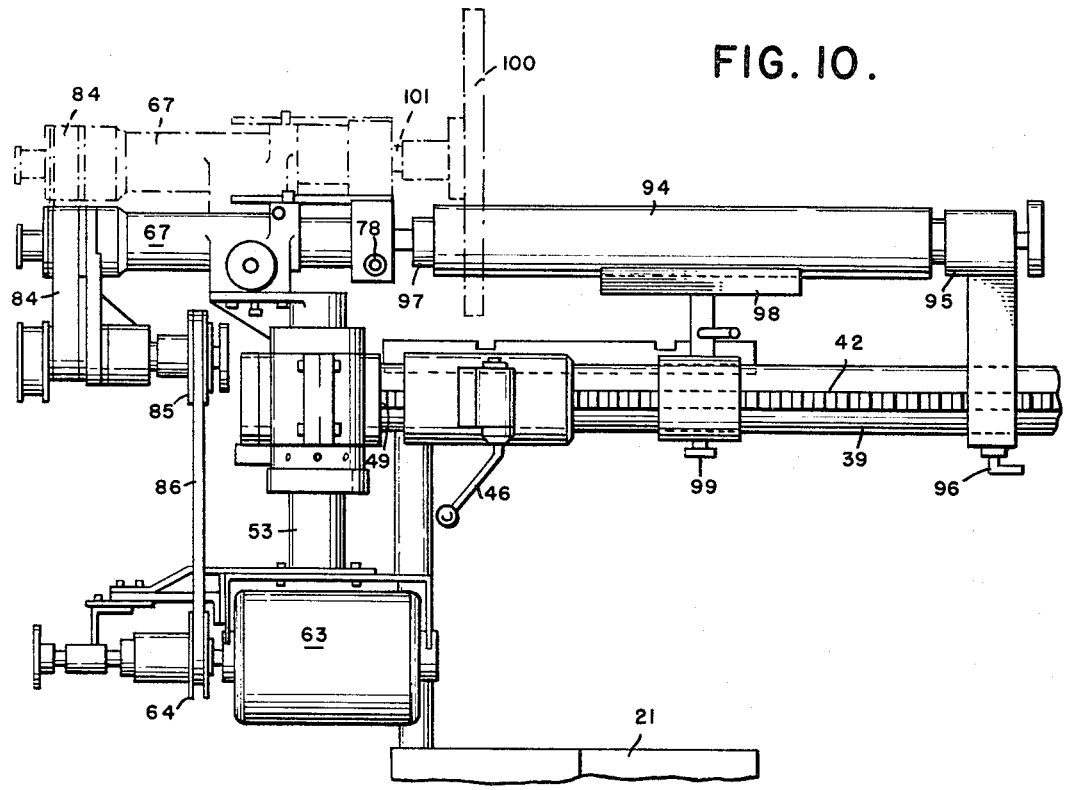

FIG. 10 is a side elevational view of the embodiment partly broken away showing in full lines the position for ordinary lathe work and, in broken lines, the position for large faceplate work.

Figure 11:
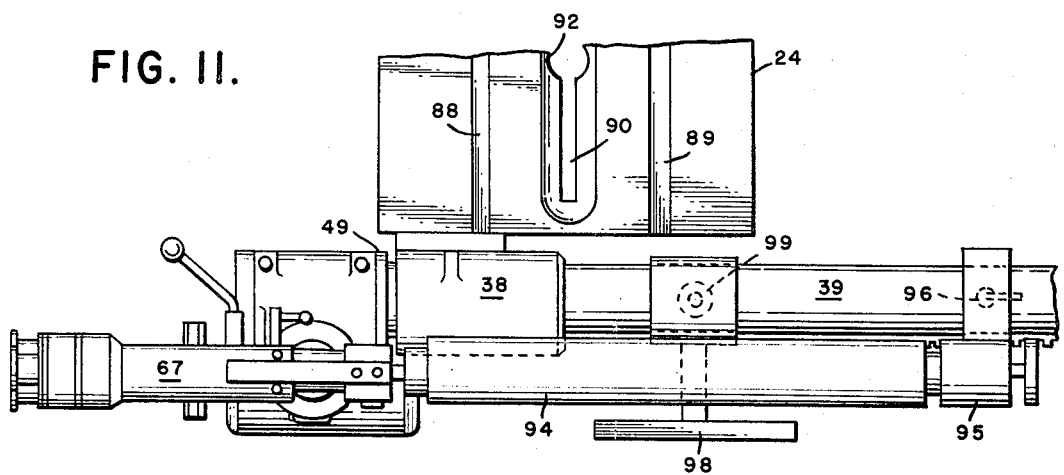

FIG. 11 is a top plan view of FIG. 10 relative to the parts shown in solid lines.

Figure 12:
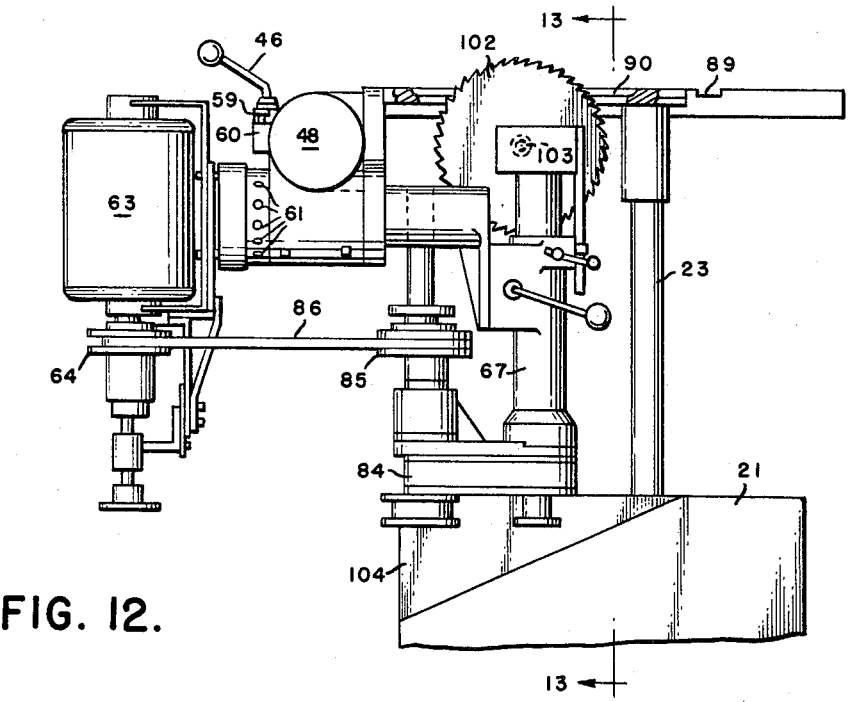

FIG. 12 is an elevational view of the embodiment in position for sawing.

Figure 13:
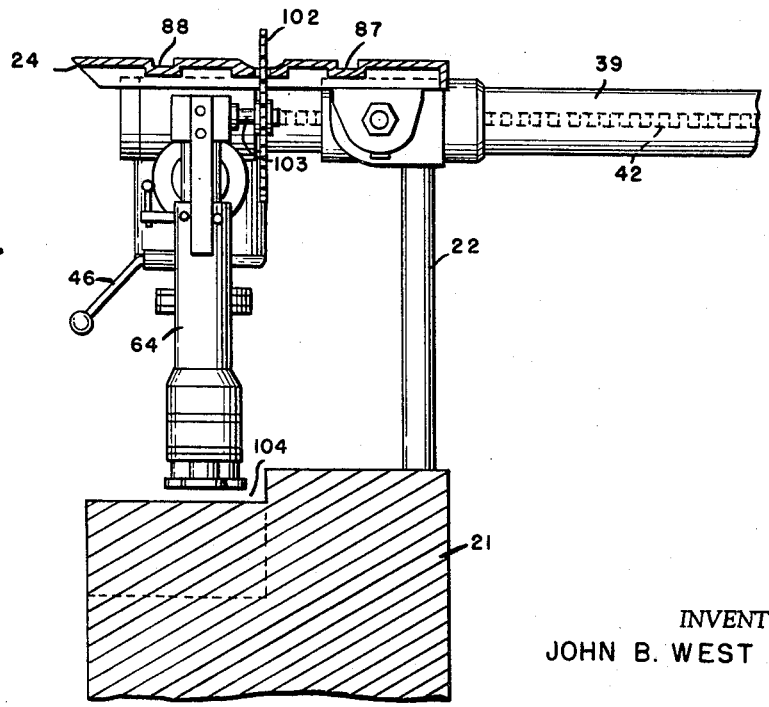

FIG. 13 is a sectional view on the line 13—13 of FIG. 12.

FIG. 14 is a side elevational view of the embodiment adjusted to the position for vertical sanding.

FIG. 15 is a front elevational view of the embodiment, partly broken away, adjusted to the position of FIG. 14.

FIG. 16 is a fragmentary view of FIG. 14 with the sanding wheel adjusted to a position for oblique sanding.

Figure 17:
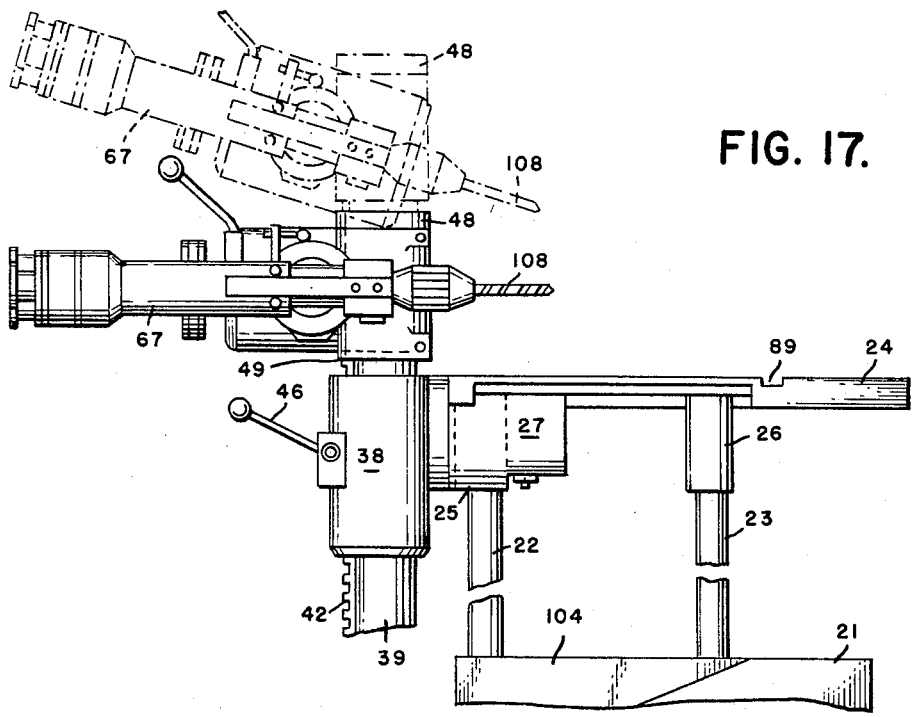

FIG. 17 is a front elevational view of the embodiment, partly broken away, showing in full lines the position of the parts adjusted to horizontal boring and, in dotted lines, boring at an inclined angle.

Figure 18:
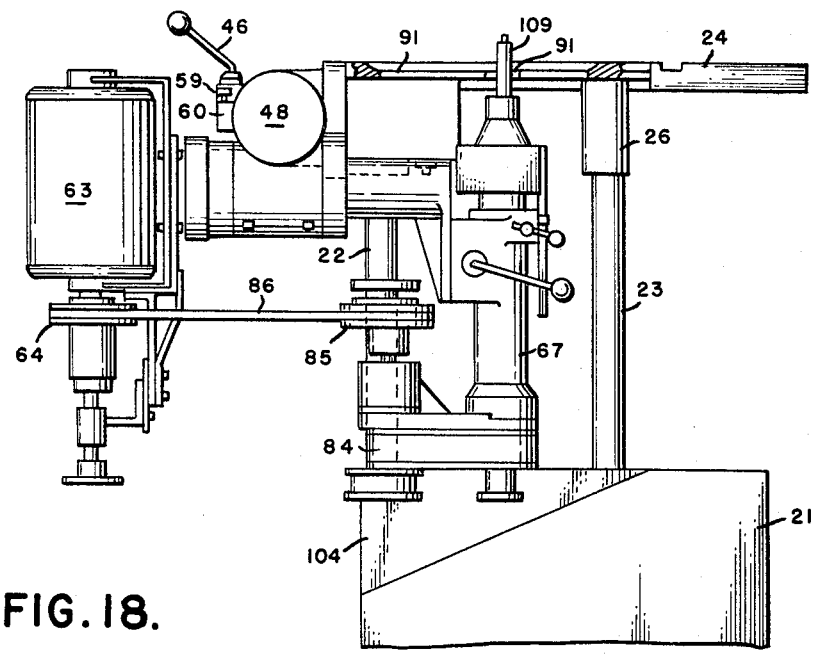

FIG. 18 is a front elevational view of the embodiment adjusted to a position for shaping.

Referring to the drawing with more particularity, the embodiment illustrated comprises a base block 21 which serves as a firm ground support.

Secured to the base block at one side are legs 22 and 23. These legs project upwardly from the block 21 to a convenient working level for an operator and a table top 24 is secured to the upper ends of the legs, preferably cantileverwise, as shown, to extend over the block 21. A firm connection is conveniently effected by caps 25 and 26 secured to the bottom of the table top 24 and engaging the upper ends of the legs.

The leg 22 is regarded as the principal support on which the superstructure is supported. For this purpose, the upper part of the cap 25 comprises a hollow portion 27 having bearings 28 and 29 adapted to rotatably support a tapered axle 30 at its cylindrical ends 31 and 32. The axle 30 has a flange 33 which abuts one side 34 of the portion 27. The axle is held in place by a bolt 35 at the opposite side 36 of the portion 27 engaging a threaded bore 37 of the axle.

The flange 33 is integral with a sleeve 38 in which there is translatably mounted a boom 39, made hollow to reduce weight. The ends of the sleeve 38 comprise split collars 40 which are adapted to be clamped against the boom 39 in selected relative positions longitudinally by means of clamping screws 41.

One side of the boom comprises a longitudinal rack 42 which is in meshed relation with pinion 43 mounted in an offset housing 44 on a shaft 45. The shaft 45 extends on one end and is provided with a turn handle for manually rotating the shaft 45 and pinion 43. By these means the boom can be easily translated to any selected position relative to the sleeve 38 and releasably clamped in the selected position. Also, the boom can be rotated in a selected position by first loosening the bolt 35, then rotating the axle 30, and then releasably securing it in the selected position by again tightening the bolt 35. However, the boom is restrained from rotating in its sleeve 38 by a closely fitting channel 46 in the sleeve through which the rack slides.

At one end of the boom 39 there is rotatably mounted a collar 47 between abutments 48, 49, the latter comprising the end of the rack 42. The collar comprises split clamping sections 50 and clamping bolts 51. Integral with the collar 47 is another collar 52, the longitudinal axes of which are at right angles to each other. A shaft 53 is translatably mounted in a spool 54 of the collar 52. Anti-friction roller bearings 55 are mounted in either end of the spool 54 adjacent the shaft 53 and they engage flat surfaces 56 of the shaft. Clamps in the form of split collar sections 57 with clamping screws 58 are provided to releasably secure the spool 54 in selected radial positions. The spool 54 is held in selected position of rotation relative to the collar 52 by means of a spring loaded pin 59 mounted in a sleeve bracket 60 of the collar, the end of the pin being adapted to engage any one of a group of circumferentially arranged apertures 61 in the member 54. Another conventional spring loaded pin (not shown) locks the shaft 53 in either extreme of its longitudinal travel.

On one end of the shaft 53 a conventional electric motor mount 62 is attached to support an electric motor 63. The power take-off of the motor comprises a variable pitch pulley 64 connected to its armature shaft.

The other end of the shaft 53 terminates in a bracket 65 in which there is attached by bolts 66, the longitudinal housing 67 of a tool head. The housing 67 contains a conventional quill 68 which is rack and pinion controlled and a conventional arbor spindle 69 mounted in suitable bearings 70. One end of the spindle 69 extends beyond the housing 67 to which there is secured a double pulley comprising a larger inner pulley 71 and a smaller outer pulley 72.

The opposite end of the spindle 69 comprises a conventional axial arbor socket 73 for engaging different tool shafts. A helical gear 74 is fixed to the spindle 69 at a position adjacent the arbor socket 73. The gear 74 meshes with another helical gear 75 carried on another but shorter arbor spindle 76 at right angles to the spindle 69 in an offset portion 77 of the quill 68. The gears 74 and 75 are in a 1 to 1 ratio. The side arbor spindle 76 has a tool socket 78 identical to the arbor socket 73 but at right angles to it.

Offset from the housing 67 by an arm 79 is a bracket 80 adapted to support a shaft 81 which is eccentrically mounted parallel to the spindle 69. To one end of the shaft 81 a double pulley is attached comprising a smaller inner pulley 82 and a larger outer pulley 83 corresponding to the pulleys 71 and 72, but in alternate order. These pulleys comprise with a belt 84 a conventional form of speed changing transmission.

To the other end of the shaft 81 a variable pitch pulley 85 is secured in the plane of the driving pulley 64 and these two coplaner pulleys are connected by a belt 86. By these means power is transmitted from the motor 63 to turn the arbor spindles 69 and 76. These drive means are effective irrespective of the rotative or translative position of the shaft 53.

The work table top 24 may be of any conventional form, but it is preferred that it be in the form shown in my copending application for patent, Ser. No. 542,785, filed Apr. 15, 1966, having channels 87, 88 and 89 for a workpiece guide (not shown), a slot 90 for a circular saw blade and drill bits. The slot 90 is provided with an enlarged opening 91 for the reception of a shaping tool.

The degrees of freedom provided by the means described above in relation to the work table top 24 and by the use of the two arbor spindles makes it possible to bring the arbor spindles in correct position for the use of any one of a wide variety of tools.

For example, in the position shown in FIG. 1, the device is adapted for drilling, with the shank of a drill bit 92 secured by a conventional chuck 93 which is secured in the axial arbor socket 73.

In the position shown in FIGS. 10 and 11, the device is adapted as a lathe. For longitudinal turning of a workpiece 94, a tailstock 95 of a conventional type may be added at the outer end of the boom and clamped in place by a clamping bolt 96, the axial arbor spindle becoming the headstock 97. A tool rest 98 of a conventional type may also be attached to the boom and clamped in position by a clamping bolt 90. For facing work, a simple plate 100 having a shank 101 is attached to the axial arbor spindle, as shown.

In the position shown in FIGS. 12 and 13, the device is adapted as a table saw, the circular saw blade 102 having its shank 103 engaged with the side arbor spindle 76. The depth of cut and/or position of the blade is controlled by same means which feeds the drill in the work. In this position, a portion 104 of the base is recessed to provide clearance for the pulleys 71, 72 and 82, 83 together with the connecting belt 80.

In the position shown in FIGS. 14 and 15, the device is adapted as a sander with the shank 104 of a sanding disc 106 engaged with the side arbor spindle 76. In this position the plane of the wheel 106 is vertical, at right angles to the plane of the table top 24. However, the sanding disc 106 can also be disposed at different angles to the plane of the table top, as shown, for example, by the obtuse angle 107 in FIG. 16. This, however, can be varied within wide limits of acute and obtuse angles.

In the position shown by the full lines of FIG. 17, the device is adapted to boring operations, the shank of the boring tool 108 being secured by a conventional chuck to the axial arbor spindle 69. However, the position of the housing 67 may be changed from the horizontal to one represented by the dotted lines to provide for angular drilling or boring.

In the position shown in FIG. 18, the device is adapted for shaping, the shank of the shaping tool 109 being mounted in the axial arbor spindle 69 and it projects from a point below the table top through the enlarged opening 91 and the setting is controlled by the drill feeding device.

I claim:

1. A multipurpose shop tool comprising a table adapted to support a piece of material to be worked on by different shop tools, an elongated member mounted for pivotal and translative adjustment relative to the table, means for holding the member in selected positions of adjustment, a second member mounted on the elongated member for pivotal and translative adjustment relative thereto, means for holding the second member in selected positions of adjustment relative to the elongated member, a tool drive assembly carried by the second member, said assembly comprising a tool head having an arbor spindle and power means for driving the spindle.

2. A multipurpose shop tool as defined by claim 1 in which the elongated member is slidably mounted on a sleeve and the sleeve is pivotally attached to the table.

3. A multipurpose shop tool as defined by claim 1 in which the second member is mounted on the first member by means which permit relative rotation in two planes at right angles to each other.

4. A multipurpose shop tool as defined by claim 1 in which the tool head comprises two arbor spindles at right angles to each other with the powered means adapted to drive both spindles.

5. A multipurpose shop tool as defined by claim 1 in which the table comprises a table top, means supporting the table top cantileverwise, including legs and a base support.

6. A multipurpose shop tool as defined by claim 1 in which the power means includes a variable speed transmission.

7. A multipurpose shop tool as defined by claim 1 in which the elongated member comprises a rack and a pinion in meshed relation with the rack for translating the elongated member relative to the table.

8. A multipurpose shop tool as defined by claim 1 in which a sleeve is mounted for pivotal adjustment relative to the table and the elongated member is translatively mounted on the sleeve with means for clamping it in different translative positions.

9. A multipurpose shop tool as defined by claim 1 in which a collar is pivotally mounted on the elongated member, said collar having a sleeve integral therewith, the axes of the collar and the sleeve being at right angles to each other, the second member being rotatably and translatively mounted in said sleeve.

10. A multipurpose shop tool as defined by claim 9 in which an intermediate member is rotatably mounted in the collar and the said second member is translatable and non-rotatably mounted in the intermediate member.

References Cited

UNITED STATES PATENTS

| | | |
|---|---|---|
| 1,618,358 | 2/1927 | Thompson. |
| 2,181,128 | 11/1939 | Hack. |
| 2,364,396 | 12/1944 | Stahler. |
| 2,835,289 | 5/1958 | Rockwell. |

WILLIAM W. DYER, Jr., *Primary Examiner.*

W. D. BRAY, *Assistant Examiner.*